United States Patent Office 3,053,754
Patented Sept. 11, 1962

3,053,754
HYDROCRACKING PROCESS AND CATALYST
Rowland C. Hansford, Fullerton, and Dean Arthur Young, Yorba Linda, Calif., assignors to Union Oil Company of California, Los Angeles, Calif., a corporation of California
No Drawing. Filed Aug. 22, 1960, Ser. No. 50,875
12 Claims. (Cl. 208—108)

This invention relates to the hydrocracking of high-boiling mineral oils to produce therefrom lower-boiling hydrocarbons, boiling for example in the gasoline range. The invention is more particularly directed toward the provision of new and novel catalysts for use in hydrocracking processes, and other acid-catalyzed reactions. Briefly, the essential novel element of the new catalysts of this invention is a highly acidic cracking base composed of a metal phosphate gel chemically compounded with boron trifluoride. The finished catalyst also includes a conventional hydrogenating component such as a Group VIII metal, which may be separately added to the cracking base as by impregnation, or may be chemically compounded therewith as metal phosphate. It has been found that boron fluoride added to such metal phosphate gel bases induces an unusually stable and highly acidic function into the catalyst. The catalysts of this invention possess the unusual property of catalyzing desired hydrocracking reactions at very low temperatures, e.g., 400° to 700° F.

It is known that the activity of various gel-type oxides, such as alumina, for promoting acid-catalyzed reactions such as isomerization and cracking can be improved by combining therewith a halogen function such as fluorine or boron trifluoride. Xerogel structures, such as those of activated alumina, are generally thought of as being anhyrous, but actually they do contain small amounts of water in the form of hydroxyl groups attached to the aluminum atoms; the removal of all such hydroxyl groups would destroy the gel structure. Thus, when activated alumina gel is reacted with boron trifluoride, the following type of reaction is believed to occur:

  (1)

The hydrogen fluoride which is liberated in this reaction can then react with other hydroxyl groups as follows:

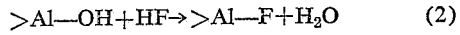  (2)

Thus, the fluorine which is introduced as BF₃ can terminate in forms bonded directly to the aluminum, or to the boron atoms. Both types of fluorine are believed to furnish desirable acidity on the catalyst. However, when water, even in trace amounts, is present in feedstocks being treated over such materials, the following exemplary types of reactions can occur, which may result in the fluorine ultimately appearing as aluminum trifluoride:

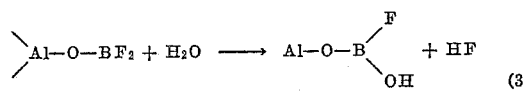  (3)

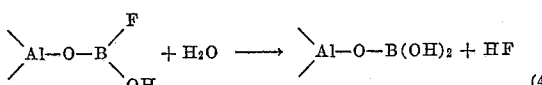  (4)

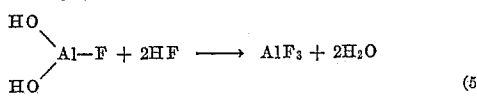  (5)

In addition, basic aluminum fluorides can disproportionate at high temperatures to yield aluminum trifluoride, e.g., as follows:

  (6)

At this point, it is important to note that aluminum trifluoride is an extremely stable, ionic compound, and is substantially completely inactive for promoting acid-catalyzed reactions. Apparently, the presence of a hydroxyl group, or an oxygen bridge, on the same aluminum atom with a fluorine atom is necessary to form the acidic centers which can catalyze acid carbonium ion type reactions.

While the foregoing is largely hypothetical, it does offer a rational explanation for the substantial difficulties which have been experienced in the past with the use of fluorided or boro-fluorided alumina gel catalysts. Such catalysts exhibit a very desirable initial activity but the activity is soon observed to decline under process conditions, even though little or no fluorine is volatilized from the catalyst and taken off with the product. Apparently, the active forms of fluorine are converted gradually, as a result of hydrolytic or disproportionation reactions, to the substantially inactive aluminum trifluoride. When this occurs, the activity of the catalyst may sometimes be restored, again temporarily, by adding more fluorine or $BF_3$ to the catalyst. But this canot be continued indefinitely, because soon the entire gel structure is destroyed with most of the alumina being converted to aluminum trifluoride.

The principal objective of this invention is to provide catalyst bases upon which boron trifluoride may be incorporated in a form which remains active for substantially longer periods of time. Another object is to provide halogenated hydrocracking catalysts which will maintain their activity for long periods of time. Still another object is to incorporate boron trifluoride into gel-type catalyst structures in such a way that the fluorine does not ultimately terminate in a non-acidic structure. Other objects will be apparent from the more detailed description which follows.

It is known that gelatinous phosphates such as aluminum phosphate are somewhat active as cracking catalysts (cf. U.S. Patent No. 2,301,913). It has now been discovered that by combining such gelatinous phosphates with boron trifluoride, the cracking activity is substantially improved, and the halogen component appears to remain active for substantial periods of time. Due to the complexity of metal phosphate gel structures, it is difficult to state with certainty the chemical reactions which take place when they are treated with $BF_3$. However, in reference to aluminum phosphate gels, the following equations illustrate what are believed to be exemplary reactions:

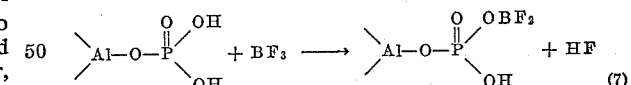  (7)

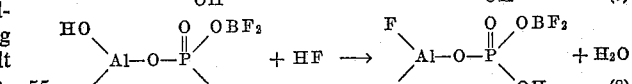  (8)

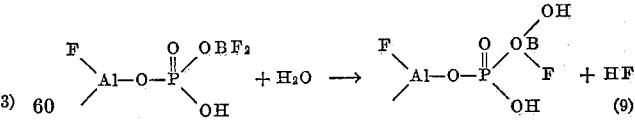  (9)

It would be expected that all of the fluorine appearing in the above structures would be highly active for promoting acid-catalyzed reactions. Moreover, due to the presence of the phosphate moiety, it is substantially impossible, under normal conditions, for any significant portion of the alumina to be converted to aluminum trifluoride. These reflections may well explain the observed catalytic activity and stability of the resulting compositions.

Metals whose phosphates can be prepared in the form of extended gel structures include substantially any of the polyvalent metals, particularly the metals of groups IIA, IIIA, IVB and IIB. Examples of suitable phosphates include titanium phosphate, zirconium phosphate, boron phosphate, zinc phosphate, cadmium phosphate, chromium phosphate, cobalt phosphate, nickel phosphate, iron phosphate, magnesium phosphate, and of course aluminum phosphate. The gel phosphates of the metals of Group VIB and Group VIII already possess the desired hydrogenating function and hence may be utilized as such, or combined with other metal phosphates, or other supporting materials. For purposes of preparing active hydrocracking catalyst supports, the phosphates of aluminum, titanium and zirconium are preferred.

While in the preferred modification of the invention, the substantially neutral metal phosphates are employed (i.e., those containing a stoichiometric ratio of phosphate to metal), it is also contemplated that the corresponding basic phosphates or acid phosphates may also be used, so long as a xerogel structure can be obtained by controlled dehydration. While any proportion of phosphate ions added to the hydrous oxides will effect some improvement in respect to the stability of the boron fluoride treated products, it is preferred to employ metal phosphates wherein the metal/phosphorus atomic ratio falls within the range of $$\frac{6}{x} \text{ to } \frac{3}{2x}$$

$x$ being the valence of the metal. This includes both the theoretically neutral metal phosphates, the acid phosphates wherein at least half of the phosphoric acid groups are theoretically neutralized by the metal, and the basic phosphates wherein at least half of the metal hydroxide groups are theoretically neutralized by phosphoric acid.

To prepare the foregoing metal phosphates in gelatinous form, it is preferred to precipiate the same from an aqueous phosphoric acid solution of a soluble salt of the polyvalent metal. The precipitation may be accomplished by the careful addition to such solutions of an alkali such as ammonia, which forms a soluble salt with the anion of the metal salt in solution. Alternatively, an organic anion-acceptor such as ethylene oxide may be added to the solution to effect the precipitation. For example, an approximately equimolar mixture of aluminum chloride and phosphoric acid in aqueous solution may be carefully neutralized by the addition of ammonia to precipitate the gelatinous aluminum phosphate, which is then recovered, as by filtration, washed, dried and calcined to the desired water content. Alternatively, ethylene oxide may be added to the aqueous aluminum chloride-phosphoric acid solution to form a gelatinous phosphate of even higher surface area, the ethylene oxide being converted to ethylene chlorohydrin. By suitably adjusting the proportion of metal salt to phosphoric acid, the corresponding basic phosphates and/or acid phosphates may be obtained.

Mixed metal phosphates can be readily prepared by simply using a mixture of soluble salts in the initial phosphoric acid solution. For example, where it is desired to prepare a catalyst comprising a mixture of aluminum phosphate and a hydrogerating metal phosphate such as nickel phosphate or chromium phosphate, mixtures of aluminum chloride and nickel chloride, or of aluminum chloride and chromium chloride may be coprecipitated as the hydrous phosphates by the foregoing techniques. Similarly, mixtures of aluminum phosphates and zirconium phosphates may be prepared by coprecipitation from an aqueous solution of aluminum chloride and zirconium chloride, either by the addition of alkali, or a halogen acceptor such as ethylene oxide.

Following precipitation of the metal phosphate, it is ordinarily desirable to wash the hydrous gel in order to remove soluble salts, or any adhering organic compounds such as ethylene chlorohydrin. For removing the latter, it is preferred to wash with an alcohol such as ethanol or isopropanol. Ammonium salts, such as the chloride, may be removed by vaporization during calcining. Generally, the phosphate gels prepared by precipitation with an organic anion-acceptor such as ethylene oxide display a higher surface area in their xerogel form than do the corresponding phosphates prepared by coprecipitation with bases such as ammonia. The washed gels are then preferably dried at e.g., 200° to 500° F., and then calcined at a higher temperature of e.g., 700° to 1,200° F. for 1 to 12 hours.

If it is desired to incorporate a hydrogenating component such as nickel or chromium by impregnation, this may be effected by conventional methods such as impregnating the wet or calcined phosphate gel with appropriate aqueous solutions of soluble salts such as nickel nitrate, which are then decomposed during a subsequent calcining to form either nickel oxide and/or nickel phosphates.

The last component to be added to the catalyst is ordinarily the boron trifluoride. In all cases the phosphate gels should be subjected to the calcining treatment to reduce the hydroxyl water content to about 0.01–5% by weight prior to the $BF_3$ treatment. Any amount of added $BF_3$ will effect an improvement in the catalytic acid function of the catalyst, and hence any such amounts are contemplated. It is preferred however to add sufficient $BF_3$ to saturate the calcined gels with $BF_3$, and this can be controlled by simply passing $BF_3$ over the catalyst at substantially any desired temperature, e.g., from 0 to 800° F., and continuing such treatment until no more water is evolved, and $BF_3$ begins to appear in the off-gases. Preferably, elevated temperatures of e.g., about 400° to 800° F. are employed during the addition of $BF_3$ in order to assist in desorbing water formed during the reaction. If desired, an inert sweep gas such as nitrogen may be admixed with the $BF_3$ in order to assist in the removal of water vapor. Atmospheric pressures are ordinarily employed during the $BF_3$ addition, but either subatmospheric or superatmospheric pressures are contemplated. The final catalysts, after the $BF_3$ treatment, will be found to have absorbed usually between about 0.1% and 20% by weight of $BF_3$, and preferably between about 1% and 10%.

Exemplary catalysts contemplated herein include the following, the proportions being by weight:

(1) 90% $AlPO_4$, 5% $Ni_3(PO_4)_2$, 5% $BF_3$
(2) 50% $AlPO_4$, 40% $Zr_3(PO_4)_4$, 5% $NiS$, 5% $BF_3$
(3) 80% $Al_2(OH)_3PO_4$, 10% $MoO_3$, 3% $CoO$, 7% $BF_3$
(4) 80% $Al(PO_4)PO(OH)_3$, 15% $NiO$, 5% $BF_3$
(5) 85% $Ti_3(PO_4)_4$, 10% $Ni_3(PO_4)_2$, 5% $BF_3$
(6) 60% $AlPO_4$, 30% $CrPO_4$, 10% $BF_3$
(7) 60% $AlPO_4$, 35% $Fe_3(PO_4)_2$, 5% $BF_3$
(8) 50% $AlPO_4$, 45% $Co_3(PO_4)_2$, 5% $BF_3$
(9) 40% $Zr_3(PO_4)_4$, 40% $Ti_3(PO_4)_4$, 15% $NiO$ 5% $BF_3$

Many other catalysts of a similar nature can also be utilized.

The catalysts of this invention may be employed for the hydrocracking of substantially any mineral oil fraction boiling above the conventional gasoline range, i.e., above about 300° F., and usually above about 400° F., and having an end-boiling point up to about 1,000° F., but preferably not greater than about 850° F. These feedstocks may be sulfur-free, or they may contain up to about 5% by weight of sulfur, in the form of organic sulfur compounds. If it is desired to maintain the catalyst in a completely sulfided state, feedstocks containing between about 0.01% and 5% by weight of sulfur may be used, or a small proportion of $H_2S$ may be recirculated in the recycle gas. Specific feedstocks contemplated comprise straight-run gas oils and heavy naphthas, coker distillate gas oils and heavy naphthas, deasphalted crude oils, cycle oils derived from catalytic or thermal cracking operations and the like. These feedstocks may be derived from petroleum crude oils, shale oils, tar sand oils, coal hydrogenation products and the like. Specifically, it is preferred to employ oils having an end-boiling-point between about 400° and 650° F., an API gravity between about 20° and 35°, and containing at least about 30% by volume of acid soluble components (aromatics plus olefins).

Hydrocracking conditions to be employed herein fall within the following ranges:

TABLE 1

|  | Operative | Preferred |
|---|---|---|
| Temperature, °F | 400–800 | 450–700 |
| Pressure, p.s.i.g | 500–5,000 | 750–2,500 |
| H₂/oil ratio, s.c.f./bbl | 1,000–15,000 | 2,000–10,000 |
| LHSV | 0.1–10 | 0.5–5 |

The lower temperature ranges from about 400° to 600° F. are normally desirable for the treatment of high-boiling feedstocks, for example those having an end-point above about 700° F. Those skilled in the art will understand that the combination of conditions selected should be correlated with the particular feedstock and catalyst used, to obtain the desired conversion per pass, normally between about 20% and 70% by volume of the feed. Ordinarily, about 500 to 3,000 s.c.f. of hydrogen per barrel of gasoline produced is consumed during the hydrocracking. "Conversion" is measured in terms of volumes of original feed converted per volume of feed processed, times 100.

The following examples are cited to illustrate the invention and the results obtainable, but are not to be construed as limiting in scope.

*Example I*

A. *Preparation of Aluminum Phosphate.*—An aqueous solution was prepared by dissolving equimolar amounts of aluminum chloride hexahydrate (1,160 gms.) and phosphoric acid (540 gms. of 85% H₃PO₄) in 1,800 ml. of distilled water. To the resulting solution was then added slowly, with stirring and cooling, an excess (1,000 gms.) of ethylene oxide. The resulting flocculent precipitate was filtered off, washed with isopropanol to remove ethylene chlorohydrin, dried, pelleted and calcined at 600° C. for about 16 hours.

B. *Impregnation with Nickel Nitrate.*—The calcined pellets from A were impregnated with a 49% alcoholic solution of nickel nitrate, then drained, dried and again calcined at 600° C. The resulting pellets contained about 5% by weight of NiO.

C. *Treatment with Boron Trifluoride.*—Dry boron trifluoride was passed over the catalyst from B at about 575° F. and atmospheric pressure, until water ceased to evolve and BF₃ began to appear in the effluent gases.

D. *Testing of Catalyst for Hydrocracking Activity.*— The foregoing catalyst was then compared in hydrocracking activity with a conventional "platforming" catalyst (0.4% pt., 0.4% F, 0.4% Cl supported on activated alumina) which had been treated with BF₃ as described in "C" above. The feedstock employed was a partially hydrogenated, 600° F. end-point coker gas oil having an API gravity of 38.3°, containing about 0.0009% nitrogen and less than 0.005% sulfur. Since the BF₃-treated platforming catalyst is initially much more active than the phosphate catalyst prepared above, it was necessary to employ lower initial hydrocracking temperatures for the former, but as deactivation proceeded the temperatures were equalized to obtain comparative data on activities following the initial decline in activity. The hydrocracking conditions were:

Temperature _____ 500–650° F.
Pressure _____ 1,000 p.s.i.g.
LHSV _____ 2.0
H₂/feed _____ 10,000 s.c.f./B.

The results were as follows:

TABLE 2

| Portion of Run | Catalyst | | | |
|---|---|---|---|---|
|  | AlPO₄+NiO+BF₃ | | Platforming Catalyst+BF₃ | |
|  | Temp., °F. | Vol. percent Conversion [1] | Temp., °F. | Vol. percent Conversion [1] |
| 0–2 Hours | 600 | 70 | 500 | 100 |
| 2–4 Hours | 600 | 70 | 500 | 80 |
| 4–6 Hours | 600 | | 500 | 57 |
| 6–8 Hours | 600 | 65 | 500 | 30 |
| 8–10 Hours | 650 | 82 | 600 | 28 |
| 10–12 Hours | 650 | 78 | 600 | 29 |
| 12–14 Hours | 650 | 77 | 600 | 28 |
| 14–16 Hours | 650 | 73 | 650 | 59 |
| 16–18 Hours | 650 | 71 | 650 | 58 |
|  | Paraffin Ratio, Iso-C₅/nC₅ | | Paraffin Ratio, Iso-C₅/nC₅ | |
| 0–8 Hour Product | 600 | 12.8 | 500 | 8.6 |
| 8–14 Hour Product | | | 600 | 5.9 |
| 14–22 Hour Product | | | 650 | 3.5 |
| 8–18 Hour Product | 650 | 11.5 | | |

[1] Total Conversion, i.e., vol.-percent disappearance of feed-boiling-range material.

It will thus be apparent that the catalyst of this invention maintains its activity for a much longer period of time than does the BF₃-treated platforming catalyst. The latter is initially very active but declines very rapidly probably due to the conversion of the halogen component to an inactive form. Hence, after 16 hours of processing, and at the same temperature (650° F.), the catalyst of this invention was giving a 73% conversion, while the BF₃-treated Platforming catalyst gave only 59%. This is even more remarkable considering the initially superior activity of the latter catalyst.

The sustained superiority of the BF₃-treated aluminum phosphate-nickel oxide catalyst with respect to iso-/normal-paraffin ratio in the product is also very striking. This is a very important advantage from the standpoint of octane values of the light product fraction.

*Example II*

To demonstrate that the addition of BF₃ is essential to obtain a hydrocracking catalyst operative at low temperatures, a blank run was carried out using the AlPO₄—NiO catalyst base of Example I, without the addition of BF₃, and using the same feed as in Example I. The hydrocracking conditions were: Temperature, 744° F.; LHSV, 4.5; hydrogen/oil ratio, 8,000 s.c.f./B; pressure, 1,000 p.s.i.g. Under these conditions the total conversion was only 3.3%, thus demonstrating that the phosphate base itself, even with the addition of a hydrogenation component, is not an effective catalyst for hydrocracking at low temperatures. It is active however at higher temperatures, but with resultant losses in selectivity and iso-/normal paraffin ratios.

When other hydrocracking catalysts within the purview of this invention are substituted in the foregoing Example I, generally similar differential results are obtained, with respect to the effect of the metal phosphate component upon catalyst stability, and iso- to normal paraffin ratios in the product. It is therefore not intended that the invention should be limited to the details described above since many variations may be made by those skilled in the art without departing from the scope or spirit of the following claims.

We claim:

1. A process for hydrocracking a high-boiling mineral oil feedstock to produce therefrom lower boiling hydrocarbons, which comprises contacting said feedstock in the presence of added hydrogen and under hydrocracking conditions including a temperature between about 400° and 800° F. and a pressure between about 500 and 5,000 p.s.i.g., with a hydrocracking catalyst comprising (1) a polyvalent metal phosphate in xerogel form, (2) a transitional metal hydrogenating component and (3) boron trifluoride combined with said metal phosphate xerogel, and recovering low-boiling hydrocarbons from said contacting.

2. A process as defined in claim 1 wherein the metal/phosphorus atomic ratio in said metal phosphate falls within the range of about $$\frac{6}{x} \text{ to } \frac{3}{2x}$$

$x$ being the valence of said metal.

3. A process as defined in claim 2 wherein said polyvalent metal is selected from the class consisting of aluminum, zirconium and titanium.

4. A process as defined in claim 1 wherein said hydrogenating component is selected from the class consisting of the group VIB and group VIII metals, and the phosphates, sulfides and oxides thereof.

5. A process as defined in claim 1 wherein said catalyst is prepared by coprecipitating the gelatinous mixed phosphates of (1) a metal from the class consisting of aluminum, zirconium and titanium, and (2) a group VIII metal, then drying and calcining the mixed gel at a temperature between about 700° and 1,200° F. for 1 to 12 hours, and then treating the calcined gel with boron trifluoride.

6. A process for hydrocracking a mineral oil feedstock boiling above the gasoline range to produce therefrom lower boiling hydrocarbons in the gasoline range, which comprises contacting said feedstock in the presence of added hydrogen and under hydrocracking conditions including a temperature between about 400° and 800° F. and a pressure between about 500 and 5,000 p.s.i.g., with a hydrocracking catalyst comprising (1) a xerogel phosphate of at least one metal from the class consisting of aluminum, zirconium and titanium, (2) an impregnated group VIII metal hydrogenation component, and (3) added boron trifluoride in chemical combination with said component (1), and recovering gasoline-boiling-range hydrocarbons from said contacting.

7. A process as defined in claim 6 wherein the metal/phosphorus atomic ratio in said metal phosphate falls within the range of about $$\frac{6}{x} \text{ to } \frac{3}{2x}$$

$x$ being the valence of said metal.

8. A process as defined in claim 7 wherein said metal phosphate is aluminum phosphate, and said hydrogenating component is selected from the class consisting of nickel metal and compounds thereof.

9. A catalyst composition having active acidity and hydrogenation activity, said catalyst comprising as the essential active components (1) a polyvalent metal phosphate in xerogel form, (2) a transitional metal hydrogenating component and (3) boron trifluoride combined with said metal phosphate xerogel.

10. A composition as defined in claim 9 wherein the metal/phosphorus atomic ratio in said metal phosphate falls within the range of about $$\frac{6}{x} \text{ to } \frac{3}{2x}$$

$x$ being the valence of said metal.

11. A composition as defined in claim 9 wherein said hydrogenating component is selected from the class consisting of the group VIB and group VIII metals, and the phosphates, sulfides and oxides thereof.

12. A composition as defined in claim 9 wherein said polyvalent metal is selected from the class consisting of aluminum, zirconium and titanium, and said hydrogenating component is selected from the class consisting of nickel metal and compounds thereof.

References Cited in the file of this patent

UNITED STATES PATENTS

| | | |
|---|---|---|
| 2,301,913 | Veltman | Nov. 17, 1942 |
| 2,859,174 | Adams et al. | Nov. 4, 1958 |
| 2,897,134 | Hirschler et al. | July 28, 1959 |

UNITED STATES PATENT OFFICE
Certificate

Patent No. 3,053,754                  Patented September 11, 1962

Rowland C. Hansford and Dean Arthur Young

Application having been made jointly by Rowland C. Hansford and Dean Arthur Young, the inventors named in the patent above identified, and Union Oil Company of California, Los Angeles, California, a corporation of California, for the issuance of a certificate under the provisions of Title 35, Section 256 of the United States Code, deleting the name of the said Dean Arthur Young from the patent as a joint inventor, and a showing and proof of facts satisfying the requirements of the said section having been submitted, it is this 11th day of December 1962, certified that the name of the said Dean Arthur Young is hereby deleted from the said patent as a joint inventor with the said Rowland C. Hansford.

[SEAL]

EDWIN L. REYNOLDS,
*First Assistant Commissioner of Patents.*